(12) United States Patent
Thomas et al.

(10) Patent No.: US 11,351,945 B1
(45) Date of Patent: Jun. 7, 2022

(54) KNEE AIRBAG COVER

(71) Applicant: Faurecia Interior Systems, Inc., Auburn Hills, MI (US)

(72) Inventors: Louis Thomas, Sunnyvale, CA (US); Harshad Potdar, Pune (IN); Chetan Jain, Pune (IN)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 0 days.

(21) Appl. No.: 17/153,363

(22) Filed: Jan. 20, 2021

(51) Int. Cl.
  *B60R 21/206* (2011.01)
  *B60R 21/2165* (2011.01)
  *B60R 21/00* (2006.01)

(52) U.S. Cl.
  CPC ........ *B60R 21/206* (2013.01); *B60R 21/2165* (2013.01); *B60R 2021/0051* (2013.01)

(58) Field of Classification Search
  CPC ............................. B60R 21/206; B60R 21/215
  See application file for complete search history.

(56) References Cited

U.S. PATENT DOCUMENTS

| | | | | |
|---|---|---|---|---|
| 6,213,497 | B1 * | 4/2001 | Spencer | B60R 21/045 280/730.1 |
| 6,302,437 | B1 * | 10/2001 | Marriott | B60R 21/20 280/728.3 |
| 7,055,851 | B2 * | 6/2006 | Takimoto | B60R 21/206 280/730.1 |
| 7,552,519 | B2 | 6/2009 | Enders | |
| 8,056,922 | B2 * | 11/2011 | Mitsuo | B60R 21/2032 280/728.2 |
| 8,408,589 | B2 * | 4/2013 | Fukawatase | B60R 21/206 280/728.3 |
| 8,500,155 | B2 * | 8/2013 | Enders | B60R 21/205 280/728.2 |
| 9,156,408 | B1 * | 10/2015 | Raines | B60R 7/06 |
| 9,555,760 | B2 * | 1/2017 | Kim | B62D 25/145 |
| 10,081,970 | B2 * | 9/2018 | Aselage | E05B 83/30 |
| 2002/0171231 | A1 * | 11/2002 | Takimoto | B60R 21/2338 280/730.1 |
| 2003/0107206 | A1 * | 6/2003 | Takimoto | B60R 21/206 280/730.1 |
| 2004/0080144 | A1 * | 4/2004 | Enders | B60R 21/206 280/728.2 |
| 2005/0116449 | A1 * | 6/2005 | Enders | B60R 21/206 280/730.1 |

(Continued)

FOREIGN PATENT DOCUMENTS

| | | | | | |
|---|---|---|---|---|---|
| BR | | PI0903044 A2 | 5/2010 | | |
| CN | | 112208478 A | * | 1/2021 | ......... B60R 21/2165 |

(Continued)

*Primary Examiner* — Nicole T Verley
(74) *Attorney, Agent, or Firm* — Reising Ethington P.C.

(57) ABSTRACT

A knee airbag cover for a vehicle includes a covering body configured to shield an airbag module from a passenger cabin. The covering body has an outer perimeter with an instrument panel facing side and a footwell facing side. The covering body also has an inner surface configured to face away from the passenger cabin and an outer surface configured to face toward the passenger cabin. The knee airbag cover further includes a footwell fastener. The footwell fastener is configured to attach a footwell so as to conceal the footwell fastener and an attachment of the covering body from the passenger cabin.

15 Claims, 5 Drawing Sheets

(56) References Cited

U.S. PATENT DOCUMENTS

| | | | | |
|---|---|---|---|---|
| 2007/0228698 | A1* | 10/2007 | Enders | B60R 21/217 |
| | | | | 280/730.1 |
| 2008/0174091 | A1* | 7/2008 | Hoshino | B60R 21/206 |
| | | | | 280/728.3 |
| 2009/0121458 | A1* | 5/2009 | Pores | B60R 21/2165 |
| | | | | 280/728.3 |
| 2011/0012329 | A1* | 1/2011 | Sekino | B60R 21/215 |
| | | | | 280/730.2 |
| 2012/0112439 | A1* | 5/2012 | Roychoudhury | B60R 21/206 |
| | | | | 280/728.3 |
| 2015/0266444 | A1 | 9/2015 | Kansteiner | |
| 2020/0282941 | A1* | 9/2020 | Ross | B60R 21/206 |
| 2020/0339059 | A1* | 10/2020 | Kobayashi | B60R 21/017 |
| 2022/0009441 | A1* | 1/2022 | Girisch | B60R 21/231 |

FOREIGN PATENT DOCUMENTS

| | | | | |
|---|---|---|---|---|
| CN | 112874465 A | * | 6/2021 | B60R 21/215 |
| DE | 102007033743 A1 | * | 4/2009 | B60R 21/213 |
| DE | 102004047332 B4 | * | 7/2010 | B60R 21/206 |
| DE | 102015114781 A1 | * | 3/2016 | B60R 21/04 |
| DE | 202019103440 U1 | * | 7/2019 | B60R 21/206 |
| DE | 102019216887 A1 | * | 5/2021 | B60R 21/237 |
| EP | 1571048 A2 | * | 9/2005 | B60R 21/206 |
| EP | 1714838 A1 | * | 10/2006 | B60R 21/045 |
| FR | 2871123 A1 | * | 12/2005 | B62D 25/145 |
| JP | 2003040069 A | * | 2/2003 | B60R 21/203 |
| JP | 2004098894 A | * | 4/2004 | B60R 21/203 |
| JP | 2004276682 A | | 10/2004 | |
| JP | 3912280 B2 | * | 5/2007 | |
| JP | 3915692 B2 | * | 5/2007 | |
| JP | 4096855 B2 | * | 6/2008 | B60R 21/203 |
| JP | 2008179295 A | * | 8/2008 | |
| JP | 2010036758 A | | 2/2010 | |
| JP | 4466472 B2 | * | 5/2010 | |
| JP | 2018162052 A | * | 10/2018 | |
| KR | 102095561 B1 | * | 4/2020 | |
| KR | 20210094201 A | * | 7/2021 | |
| WO | WO-0204262 A1 | * | 1/2002 | B60R 21/237 |
| WO | WO-2009069466 A1 | * | 6/2009 | B60R 21/206 |
| WO | WO-2009142032 A1 | * | 11/2009 | B60R 21/2338 |
| WO | WO-2010016398 A1 | * | 2/2010 | B60R 21/231 |
| WO | WO-2010103622 A1 | * | 9/2010 | B62D 25/145 |
| WO | WO-2010143289 A1 | * | 12/2010 | B60R 21/206 |
| WO | WO-2016142083 A1 | * | 9/2016 | B60R 21/2176 |

* cited by examiner

KNEE AIRBAG COVER

TECHNICAL FIELD

The present disclosure is related generally to airbag covers used in vehicle interiors and, more particularly, to knee airbag covers located between the instrument panel and the footwell.

BACKGROUND

Airbags are commonly employed safety devices in vehicle interiors, but their presence is often entirely unknown to vehicle occupants until deployed in the event of a relatively severe collision. This is because undeployed airbags are hidden from view, typically behind a decorative panel that provides the passenger cabin of the vehicle with a desired aesthetic by concealing other vehicle components that are strictly utilitarian.

Knee airbag covers are typically located between the instrument panel and the footwell to cover an airbag module that deploys to protect the knees of a vehicle occupant. Sometimes, this area is more hidden from view so the knee airbag cover will include visible fixations and there can be an undesirably sized gap between the cover and the instrument panel. However, minimizing the gap size and removing visible fixations can provide a more aesthetic appearance, particularly when the vehicle door is opened, which can result in a more direct line of site to the knee airbag cover. Moreover, mounting the airbag module to the airbag cover itself can help streamline the assembly, as compared with airbag modules that are mounted to the cross car beam. JP2004276682 to Katsuhiro also mounts the airbag module to the knee airbag cover, but the cover in this reference does not include a footwell fastener, therefore, it is not providing direct attachment of the cover to the footwell.

SUMMARY

An illustrative knee airbag cover includes a covering body configured to shield an airbag module from a passenger cabin. The covering body has an outer perimeter with an instrument panel facing side and a footwell facing side. The covering body also has an inner surface configured to face away from the passenger cabin and an outer surface configured to face toward the passenger cabin. The knee airbag cover further comprises a footwell fastener. The footwell fastener is configured to attach a footwell so as to conceal the footwell fastener and an attachment of the covering body from the passenger cabin.

In various embodiments, the footwell fastener is a magnetic plate.

In various embodiments, there is a second footwell fastener. The footwell fastener is located toward a door facing side of the outer perimeter, and the second footwell fastener is located toward a center console facing side of the outer perimeter.

In various embodiments, there is an airbag net molded into the covering body.

In various embodiments, a tear seam in the covering body at least partially surrounds the airbag net.

In various embodiments, there is a plurality of airbag module fasteners molded into the covering body.

In various embodiments, the plurality of airbag module fasteners includes a plurality of metal nuts molded into a plastic covering body so as to partially surround an airbag net.

In various embodiments, a plurality of hooks is situated at the instrument panel facing side of the outer perimeter of the covering body to rotatably attach an instrument panel.

In various embodiments, there is a vehicle comprising a cross car beam, an instrument panel, and the knee airbag cover. The knee airbag cover is located at least partially between the instrument panel and the footwell, and wherein at least one of the instrument panel, the footwell, and the knee airbag cover are connected to the cross car beam.

In various embodiments, the footwell is directly attached to the knee airbag cover via the footwell fastener.

In various embodiments, the attachment of the covering body is a cross car beam fastener that attaches the cross car beam to the knee airbag cover.

In various embodiments, the cross car beam fastener is non-visible from the passenger cabin.

In various embodiments, there is an airbag module fastened to the inner surface of the covering body of the knee airbag cover.

There is also an illustrative method of manufacturing the knee airbag cover comprising the steps of molding a plastic material for the covering body around the footwell fastener, and wrapping the covering body with a decorative covering. The method may also include the step of forming a tear seam in the covering body that at least partially surrounds an airbag net.

It is contemplated than any of the above-listed features can be combined with any other feature or features of the above-described embodiments or the features described below and/or depicted in the drawings, except where there is an incompatibility of features.

BRIEF DESCRIPTION OF THE DRAWINGS

Illustrative embodiments will hereinafter be described in conjunction with the following figures, wherein like numerals denote like elements, and wherein.

DESCRIPTION OF ILLUSTRATIVE EMBODIMENTS

Described herein is a knee airbag cover that is configured to hide an airbag module that is located proximate an occupant's knees, while advantageously maintaining a streamlined aesthetic appearance for the vehicle interior cabin. The knee airbag cover includes a strategic arrangement of fasteners to couple various portions of the overall assembly, such as the airbag module, the instrument panel, the cross car beam, and the footwell. The knee airbag cover has a covering body which is configured to shield the airbag module from the passenger cabin. The covering body includes a footwell fastener that is molded into or otherwise joined with the covering body. In one particularly advantageous embodiment, the footwell fastener is a magnetic plate that facilitates attachment between the knee air bag cover and the footwell in a manner that is non-visible from the passenger cabin and helps to conceal attachment of the knee airbag cover with the cross car beam. Other features such as hooks for rotatable attachment to the instrument panel and strategically molded in airbag module fasteners can further improve installation and enhance the appearance of the installed knee airbag cover. Additionally, manufacture of the knee airbag cover described herein can involve less assembly and a fewer number of parts than other cover assemblies, which may, for example, employ a standard cross car beam mounting of the airbag module.

Figure 1:
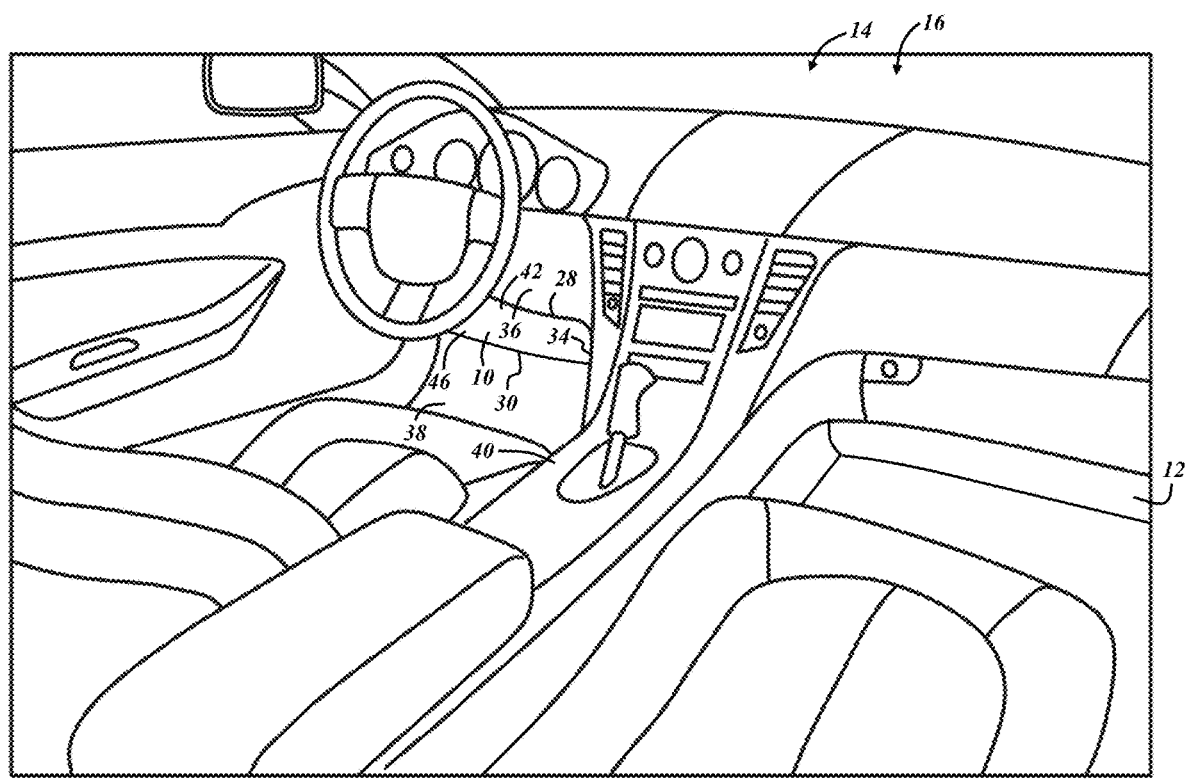
FIG. 1 is a perspective view of a vehicle interior cabin showing knee airbag covers.

FIG. 1 illustrates two knee airbag covers 10, 12 located in the interior passenger cabin 14 of a vehicle 16. The discussion herein is focused on the knee airbag cover 10, which is located on the driver side of the vehicle 16 in the illustrated embodiment, but the teachings are applicable to either or both knee airbag covers 10, 12, whether located on the driver side or the passenger side of the vehicle. Oftentimes, the knee airbag covers 10, 12 are generally hidden from view, but in certain instances, such as when the door 18 is open for example, the knee airbag cover 10 may be visible to a vehicle onlooker or occupant. Various attachment features described herein can facilitate a more streamlined aesthetic look for the knee airbag cover 10.

Figure 2:
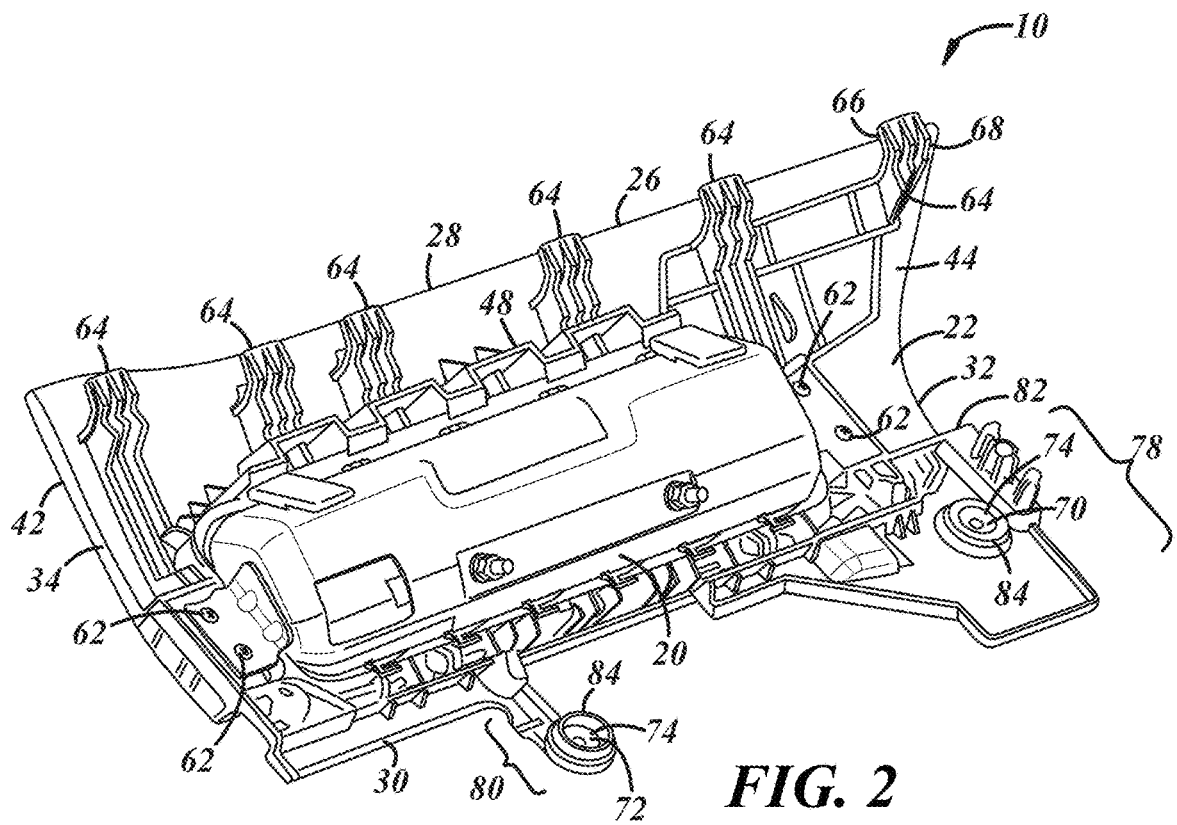
FIG. 2 shows the inner surface of the covering body of a knee airbag cover with an airbag module installed.
Figure 3:
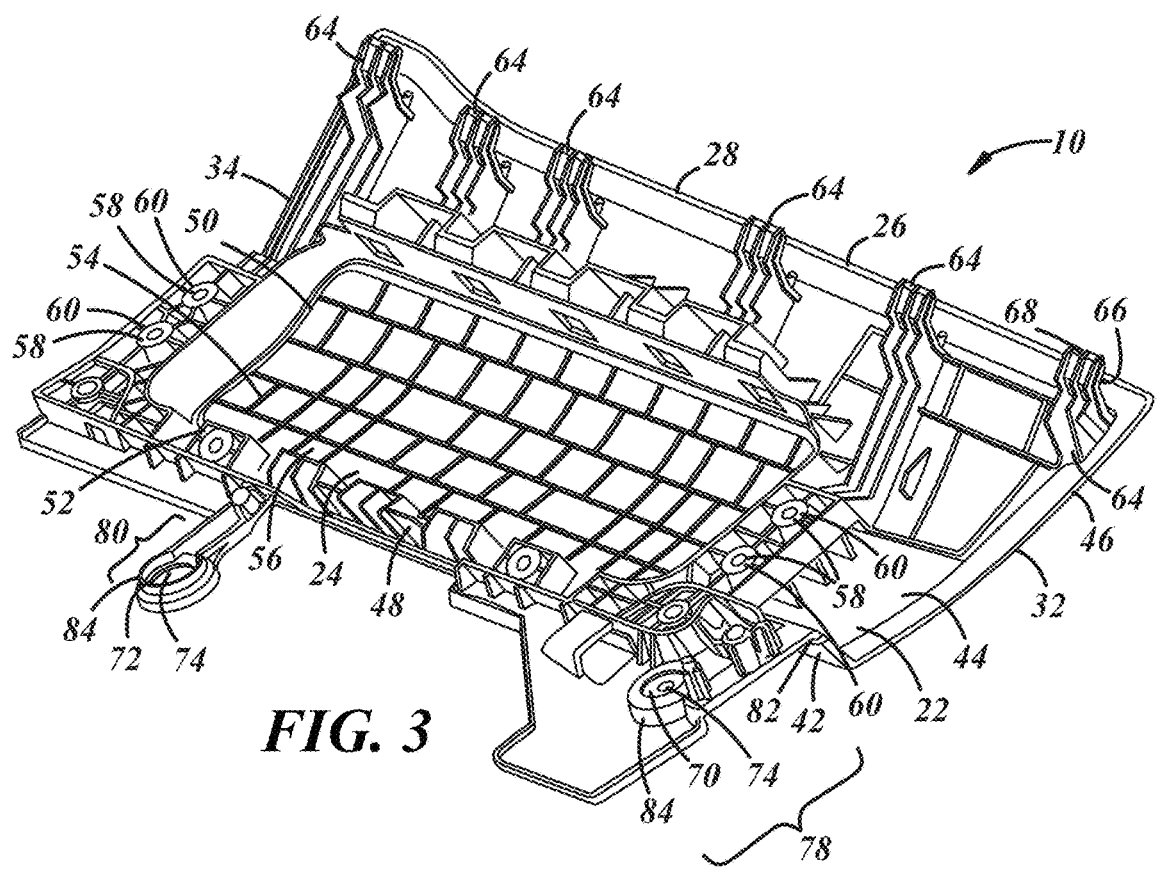
FIG. 3 shows the inner surface of the knee airbag cover of FIG. 2 without the airbag module.

As shown in FIG. 2, the knee airbag cover 10 is configured to shield an airbag module 20 from the passenger cabin 14 of FIG. 1. FIG. 2 shows the knee airbag cover 10 with the airbag module 20, and FIG. 3 shows the knee airbag cover with the airbag module removed. The airbag module 20 includes an airbag that is in a deflated state and configured to inflate in a vehicle collision, and a chute used to restrict airbag inflation to a direction toward the passenger cabin 14. A chute may be formed separately from and subsequently attached to the covering body 22, as with the pictured airbag module 20. Or, a chute may be integrally formed with a covering body 22 of the knee airbag cover 10. Other airbag and airbag module configurations and mounting arrangements are certainly possible, but as described herein, the airbag module 20 is advantageously fastened to the covering body 22 of the knee airbag cover 10. This configuration can avoid the need to weld or otherwise attach the airbag module to the cross car beam. Two components that are fastened to each other, such as with the airbag module 20 and the covering body 22, include a direct and/or indirect coupling via various methods of attachment, and may not be limited to the specific joining style illustrated in the figures or described herein. Moreover, fasteners may take a variety of forms, so long as it generally serves to facilitate attachment or otherwise couple or join two components together. Direct attachment is attachment between two components that directly touch each other without intervening components.

The covering body 22 of the knee airbag cover 10 is the primary structural substrate or panel that provides the overall size and shape of the knee airbag cover 10. The covering body 22 is thus sufficiently rigid to maintain its shape in the vehicle interior cabin. Exemplary covering bodies are made from or include injection molded materials such as semi-rigid thermoplastic materials (e.g., filled or unfilled poly-olefins or thermoplastic elastomers) having a nominal thickness in a range from 2.0 mm to 4.0 mm. In an advantageous embodiment, the covering body 22 is made from injected glass filled polypropylene that at least partially surrounds an airbag net 24. The airbag net 24 is a sheet of more flexible material or less brittle material than the material for the covering body 22 (e.g., a thermoplastic elastomer airbag net 24 molded into the polypropylene covering body 22). This can help control the stress response of the knee airbag cover 10 upon deployment of the airbag of the airbag module 20.

Figure 4:
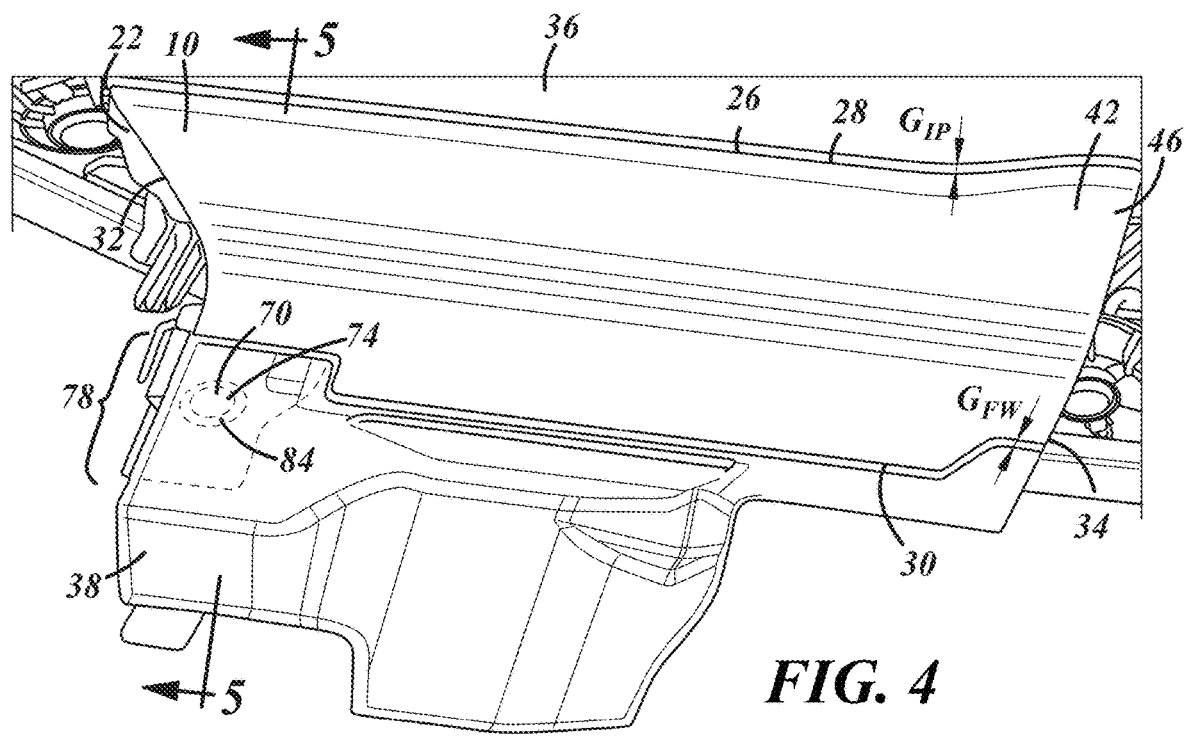
FIG. 4 shows the outer surface of the covering body of the knee airbag cover of FIGS. 2 and 3.
Figure 5:
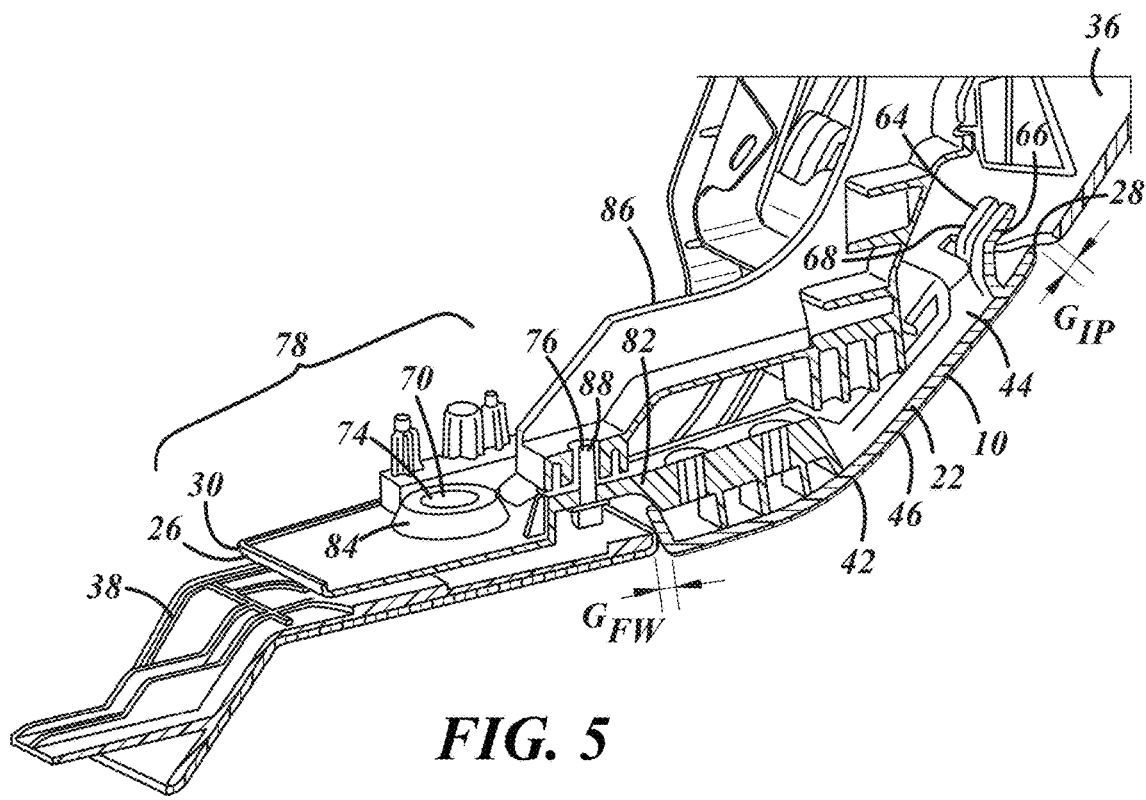
FIG. 5 is a partial view showing an example connection configuration between the knee airbag cover, the cross car beam, and the footwell.

The covering body 22 has an outer perimeter 26 that generally defines the boundaries of the knee airbag cover 10 with the other nearby components in the passenger cabin 14. Accordingly, the outer perimeter 26 includes an instrument panel facing side 28, a footwell facing side 30, a door facing side 32, and a center console facing side 34. With reference to FIGS. 1, 4, and 5, the instrument panel facing side 28 directly abuts or faces the instrument panel 36. The footwell facing side 30 directly abuts or faces the footwell 38. The door facing side 32 directly abuts or faces the door 18 (when the door is closed). The center console facing side 34 directly abuts or faces the center console 40. It is possible, however, to have other panels interface near the outer perimeter 26 of the covering body and its various sides. Moreover, each of the sides 28, 30, 32, 34 may have a different shape or configuration that what is particularly illustrated herein. For example, one or more sides of the outer perimeter 26 could have various cut outs, projections, or other shape variations. In another example, one of the sides, such as the footwell facing side 30, could have a more curved outline that connects all the way to the instrument panel facing side 28, thereby obviating the need for a separate and distinct center console facing side or door facing side. Other example configurational variations are certainly possible and will depend on the desired configuration for the passenger cabin 14 and its constituent components.

The covering body 22 has an outer surface 42 which faces toward the passenger cabin 14, and an inner surface 44 that faces away from the passenger cabin. The outer surface 42 in this embodiment includes a decorative wrapping or covering 46. The decorative covering 46 provides the knee airbag cover 10 with a desired aesthetic and may be a single-layer or multilayer component including an outer decorative layer (e.g., leather, simulated leather, veneer, fabric, etc.) that faces the interior of the passenger cabin 14 of the vehicle 16 when installed, and possibly one or more underlying layers, such as a spacer or an elastic foam layer that provides the cover 10 with a cushion-like character. The decorative covering 46 can be provided as a one-piece upholstery-like component separately from the covering body 22 and then attached to the outer surface 42 of the covering body, or a portion of the decorative covering such as a foam layer can be formed in place between a decorative layer and the covering body 22 during assembly of the knee airbag cover 10. In some embodiments, instead of fabric, the decorative covering 46 can be a simpler decorative layer, such as a single layer of paint or film.

The covering body 22, with reference to the views of the inner surface 44 depicted in FIGS. 2 and 3, has a number of structural features designed to facilitate installation and enhance the performance and aesthetic of the knee air bag cover 10 and/or the airbag module 20. The airbag module 20 is advantageously surrounded at least partially by a projecting frame 48, which can help locate, align, and/or retain the airbag module. The projecting frame 48 has a substantially rectangular shape that generally coincides with the shape of the airbag module 20 and/or the airbag net 24. In the illustrated embodiment, the airbag net 24 also has a rectangular shape that fits within the boundaries of the projecting frame 48. The projecting frame 48 is an integrally molded feature in the covering body 22; however, other clips, edging etc. could be included, or in other embodiments, no frame at all is included. The projecting frame 48 can have one or more corrugated style edges, as shown, or other shapes that may promote attachment of the airbag module 20. This arrangement can be beneficial in implementations such as those illustrated, in which the airbag module 20 is attached to the covering body 22 of the knee airbag door 10 instead of being attached to a cross car beam.

A tear seam 50 can be formed in the covering body 22 and/or in the decorative covering 46. The tear seam 50 in this embodiment includes a laser weakened area that is generally located just inboard of the projecting frame 48 so as to at least partially surround the area in which the airbag module 20 is situated. Additionally, the tear seam 50 at least partially surrounds the molded in airbag net 24, which provides for more flexible or less brittle material in a deployment region for the airbag module 20. In some embodiments, the tear seam 50 may extend at least partially through the airbag net 24 as well. It is possible to have alternately shaped tear seams (e.g., U-shape, H-shape, etc.), hinge features, more of a door structure, etc. depending on the desired implementation. The illustrated configurations are non-limiting. For example, the tear seam 50 may include or be formed from a series of through-openings in the covering body 22, a series of blind laser-formed holes, or any other suitable feature that causes the covering body and/or the airbag net 24 to split along that feature to form an airbag door.

Within the projecting frame 48 and the tear seam 50, a network 52 of ribs or relief lines 54 may be formed from material of the covering body 22 which is injected over the more flexible material of the airbag net 24. The relief lines 54 (only one labeled for clarity purposes) extend to create a staggered tile network 52 throughout the entire door area 56 inboard of the projecting frame 48. The relief lines 54 may serve as stress management features configured to direct stresses to desired portions or points along the door area 56 while the covering body 22 splits to form the airbag door. It is also possible to have relief lines 54 of different shapes and configurations beyond that illustrated in FIG. 3 (e.g., curvilinear). The projecting frame 48 and the relief lines 54 are advantageously formed on the inner surface 44 of the covering body 22. This can provide a smoother outer surface 42 for the decorative covering 46.

A number of airbag module fasteners 58 are located around the perimeter of the projecting frame 48 to facilitate attachment of the airbag module 20 within the door area 56. In this embodiment, the airbag module fasteners 58 include a plurality of metal nuts 60, two of each being located on either side of the door area 56 toward the door facing side 32 and the center console facing side 34, respectively, although the arrangement of the fasteners 58 will largely depend on the specifications of the airbag module 20. Accordingly, other arrangements for the airbag module fasteners 58 are possible, such as locating them in the corners of the projecting frame 48. Further, it is possible to include other types of airbag module fasteners 58. In the illustrated embodiment, the metal nuts 60 are used to accommodate air bag module screws 62, but other types of fastening are certainly possible, such as the use of brackets, clips, etc. for the airbag module fasteners 58. The metal nuts 60 are advantageously steel or another type of metal material that is insert molded into the covering body 22. This can provide additional resiliency for the attachment between the knee airbag door 10 and the airbag module 20.

The inner surface 44 of the covering body 22 also includes a plurality of integrally molded hooks 64 that are spaced along the instrument panel facing side 28 of the outer perimeter 26. The hooks 64 are situated toward the instrument panel facing side 28, meaning that they are closest to the instrument panel facing side as compared with their distance to the opposite footwell facing side 30. The various components of each hook 64 are described with respect to the first hook adjacent the door facing side 32 of the covering body 22, but are applicable to the other hooks as well. Each hook 64 has a claw portion 66 which juts out or projects directly from the inner surface 44 and is configured to directly interface or contact against the instrument panel 36. Opposite the claw portion 66 on the back of each hook 64, there are reinforcing ribs 68 which can help impart additional structural integrity. The plurality of hooks 64 can rotatably attach the instrument panel 36, which can improve installation. For example, with reference to FIGS. 4 and 5 in particular, the hooks 64 can help easily align and locate the instrument panel 36 such that upon installation, there is a gap $G_{IP}$ between the knee air bag cover 10 and the instrument panel 36. The structure of the hooks 64 can help minimize the size of the gap $G_{IP}$, which can provide a better aesthetic within the passenger cabin 14. In particular the gap $G_{IP}$ in the embodiments described herein are oftentimes less than 1 mm to provide a more flush appearance, whereas more standard gap sizes are typically more than 3 mm. The hooks 64 located adjacent to, and opening toward, the instrument panel facing side 28 can help achieve this substantial gap size reduction.

With particular reference to FIG. 5, toward the footwell facing side 30, there are one or more footwell fasteners 70. More particularly, in this embodiment, there is a first footwell fastener 70 and a second footwell fastener 72. In an advantageous embodiment, as illustrated in FIGS. 2-5, the footwell fasteners 70, 72 are circular magnetic plates 74 that are molded into the covering body 22. Each footwell fastener 70, 72 is located toward the footwell facing side 30 of the outer perimeter 26 (i.e., further toward the footwell facing side 30 as opposed to being closer to the instrument panel facing side 28). The footwell fasteners 70, 72 are configured to attach the footwell 38 so as to conceal the footwell fastener itself and an attachment 76 of the covering body 22 from the passenger cabin 14. This fastener and attachment concealment provides a more streamlined aesthetic appearance for the knee airbag cover 10. As shown in FIG. 4, the entire outer surface 42 of the knee airbag cover 10 is covered in decorative covering 46 without any fasteners showing in the passenger cabin 14. Further, the gaps $G_{IP}$, $G_{FW}$ are flush, creating smooth transitions between the instrument panel 36, the knee airbag cover 10, and the footwell 38.

The footwell fasteners 70, 72 are located in overlap regions 78, 80, respectively, which are areas in which the covering body 22 overlaps with the footwell 38 when installed in the vehicle 16. The overlap regions 78, 80 may be projections from the footwell facing side 30 as shown, and may also include an angled transition projection 82 at the start of the overlap region 78. This allows for a smaller and more flush gap $G_{FW}$ between the knee airbag cover 10 and the footwell 38. The angled transition projection 82 creates an offset or step in the covering body 22 to allow for a more nested arrangement between the knee airbag cover 10 and the footwell 38.

The number of footwell fasteners 70, 72 will depend on the size and requirements of the overall assembly. In an advantageous embodiment, there are three footwell fasteners located along the footwell facing side 30 of the covering body 22, with one located toward the door facing side 32, one located toward the center console facing side 34, and one located more toward the center between the two sides 32, 34. In another embodiment, as illustrated, there are two footwell fasteners 70, 72. In yet other embodiments, there may be less footwell fasteners or more footwell fasteners than what is particularly described herein. When using magnetic plates 74 for the footwell fasteners 70, 72, the strength and size of the magnet may help dictate the number of fasteners needed for adequate attachment.

Magnetic plates 74 are advantageously used for the footwell fasteners 80, 82. Such a form of retention, which can be easily attached without screwing or inserting an extra tool or fastening device, and then removed when a certain amount of force is applied, can help installation efforts. Each magnetic plate 74 is insert molded into the covering body 22 and includes a retaining rim 84 which at least partially surrounds the fastener 70, 72. With particular reference to FIG. 5, the magnetic plate 74 footwell fastener 70 allows for attachment of the knee airbag cover 10 to the cross car beam 86 with the cross car beam fastener 88 (which is a screw in this embodiment), to provide attachment 76 between the knee airbag cover and the cross car beam. This arrangement shields the cross car beam fastener 88 with the portion of the footwell 38 that is in overlap region 78, thus making the attachment 76 non-visible in the passenger cabin 14, even in instances when an occupant is entering and exiting the vehicle. The attachment 76 between the knee airbag 10 and the cross car beam 86 is also non-visible in the passenger cabin 14 when the occupant is sitting in the vehicle 16. The attachment 76 between the knee airbag 10 and the cross car beam 86 is also configured to occur in the overlap region 78 to enhance concealment. The footwell fastener 70 helps create the shield for blocking visibility of the attachment 76, but it should be understood that the footwell fastener 70 helps shield other (and all) attachments from the passenger cabin 14.

The magnetic plates 74 are circular plates, but it should be understood that the shape can be adjusted depending on the desired implementation. The circular shape can provide more surface area for attachment while taking up less space with respect to the remainder of the covering body 22. Given the circular shape of each magnetic plate 74, the retaining rim 84 is also circular and wholly surrounds the plate. Other configurations for the retaining rim 84 are possible as well. For example, the retaining rim 84 may only partially surround the magnetic plate 74, or there might not be a retaining rim at all.

Figure 6:
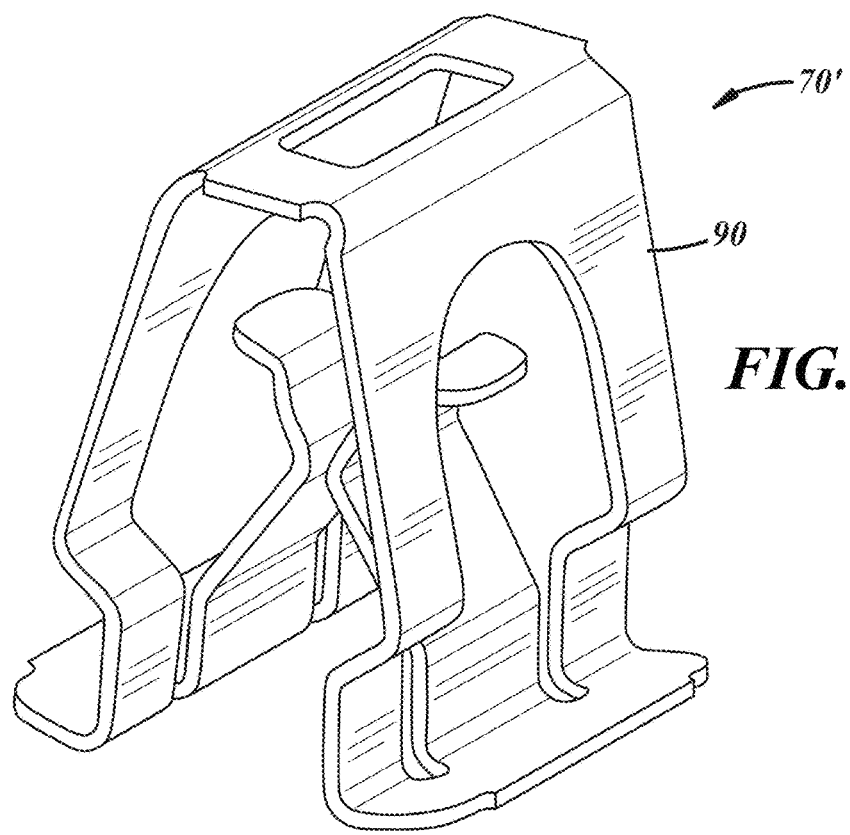
FIG. 6 shows a clip that may be used as a footwell fastener for the knee air bag cover.
Figure 7:
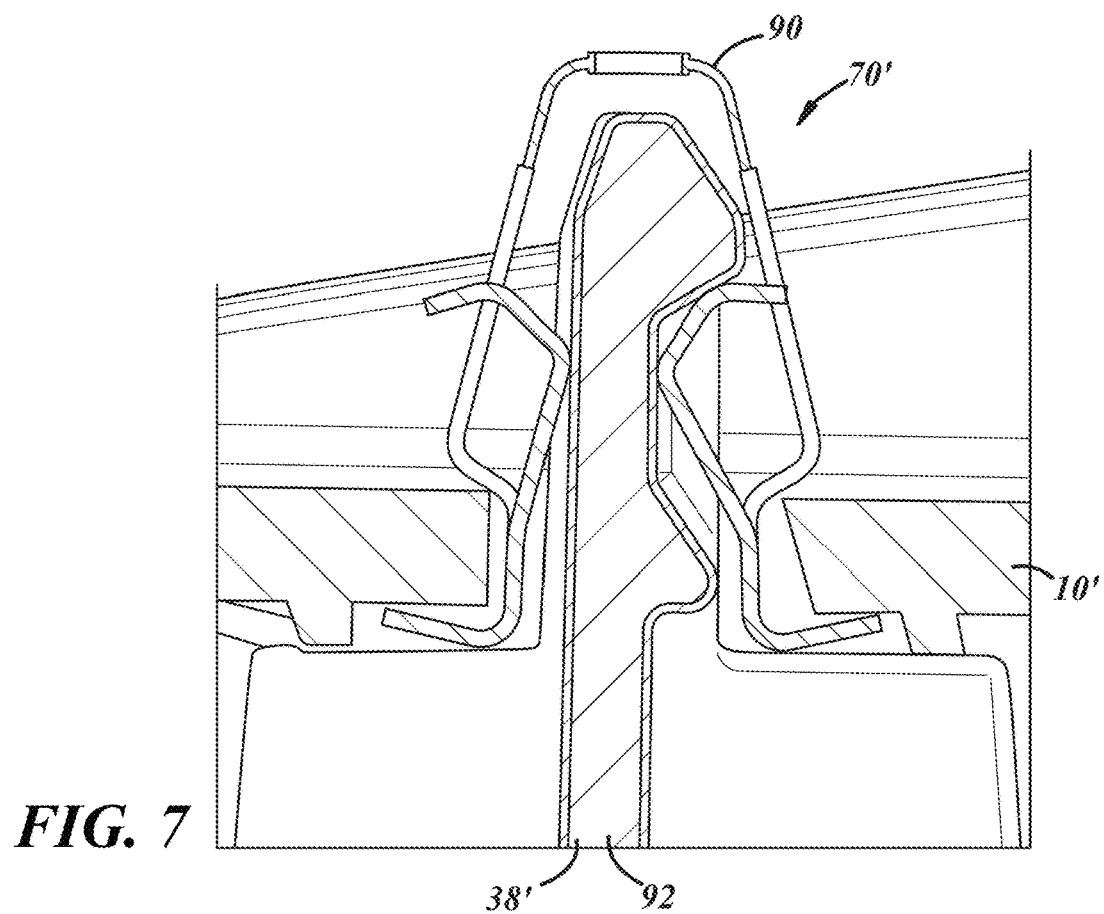
FIG. 7 is a partial view showing operation of the clip of FIG. 6 as the footwell fastener.

FIGS. 6 and 7 illustrate another embodiment of a footwell fastener 70'. In this embodiment, the footwell fastener 70' is a retaining clip 90 that is integrated with the knee airbag cover 10' and designed to accommodate a retaining projection 92 in the footwell 38'. It should be understood, however, that the clip 90 could be alternately integrated with the footwell 38', and the knee airbag cover 10' could incorporate the retaining projection 92. Other clip forms or fastener forms may be used to facilitate attachment to the footwell. However, advantageously, the footwell fastener should take a form that renders it non-visible from the passenger cabin 14.

Figure 8:
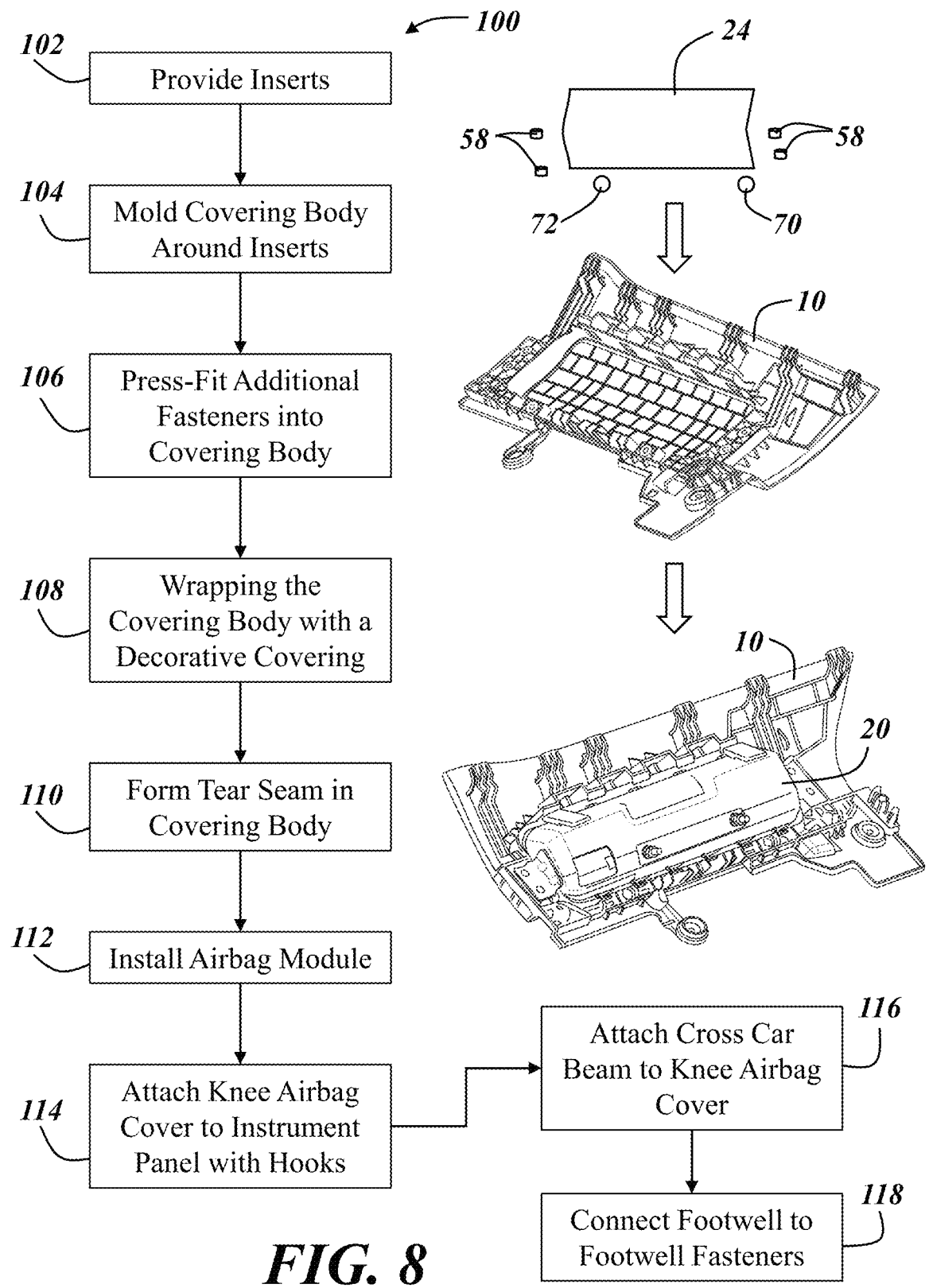
FIG. 8 is a flowchart illustrating example method steps that may be used to manufacture and install a knee air bag cover.

FIG. 8 is a flowchart illustrating an example method 100 for manufacturing and installing the knee airbag cover 10. It should be understood, however, that the knee airbag cover 10 can be manufactured and installed in accordance with other methods and processes as well. Further, some of the steps described herein are optional, and there could be more steps than what is particularly described. There could be intermediate processing steps such as different milling or machining operations, or different post-processing steps, such as installing an emblem, to cite a few examples. Additionally, the method 100 is described within the context of manufacture the knee airbag cover 10 depicted in FIGS. 1-5 (some reference numerals are omitted from the FIG. 8 flowchart for clarity purposes, but reference can be made to FIGS. 1-5 for labels of particular components). However, it is possible to manufacture other knee airbag cover designs using one or more of the method steps recited herein.

Step 102 involves providing inserts for the knee airbag cover 10. The inserts in this particular embodiment include the airbag net 24, airbag module fasteners 58, and the footwell fasteners 70, 72. The inserts can be placed in an injection mold, and in step 104, the covering body 22 is molded around the inserts. Overmolding the inserts allows for variation in the materials used for performance enhancement and operational functionality. The injection molding process is advantageously a microject process, which can form more detailed subcomponents in the covering body 22, such as the relief lines 54 to cite one example. Microject can also allow the formation of intricate features without readthough on the outer surface 42. Step 106 is optional, and involves press-fitting additional fasteners into the covering body. In some embodiments, all non-integral fasteners may be insert molded in step 102. In the illustrated method, a subsequent press-fit step, as with step 106, can help overcome challenges that could be incurred with insert molding some fasteners in particularly configured tooling. Press-fitting fasteners in a step after molding the plastic material for the covering body may be easier to manufacture if there are limitations in the tooling. Step 108 is also optional, and involves wrapping the outer surface of the covering body with the decorative covering 46. This can provide a more cohesive look to the vehicle interior cabin 14. Step 110 involves forming the tear seam 50 in the covering body 22. There may also be a tear seam formed in the decorative covering 46 at this stage too. Laser weakening may be used to form the tear seam, which is a relatively efficient manufacturing process. Other processes for forming the tear seam are possible too, such as milling, piercing, etc. At this point in the method 100, the knee airbag cover 10 is essentially fully formed.

Step 112 involves installing an airbag module 20 to the inner surface 44 of the covering body 22. Airbag module fasteners 58 may be used to accomplish this step, and a variety of different types of airbag modules can be used. Moreover, the configuration of the inner surface 44 can be varied to accommodate different types of airbag modules. After installation of the airbag module 20, the knee airbag cover 10 is attached to the instrument panel 36 with the hooks 64. In some implementations, because of the rotatable nature of the attachment between the knee airbag cover 10 and the instrument panel 36, the airbag module 20 may not be installed until after the knee airbag cover is attached to the instrument panel. The knee airbag cover 10 can rotate or pivot up toward the cross car beam 86, where step 116, or attachment of the cross car beam, can occur. The screw or cross car beam fastener 88 allows for attachment of the knee airbag cover 10 in the overlap region 78 (see FIG. 5). This location provides for suitable attachment of the cross car beam 86 to the knee airbag cover 10 and allows for the attachment 76 to be hidden by the footwell 38. Usually cross car beam fasteners 88 are top to bottom, but with this knee airbag cover 10 arrangement, they are bottom to top. In step 118, the footwell is installed in step 118. The attachment of the knee airbag covering 10 at the footwell fastener 72 is also concealed by this arrangement. The footwell 38 is brought toward the footwell facing side 30 of the knee airbag cover 10 and the footwell fasteners 70, 72 provide for tool-free attachment between the knee airbag cover 10 and the footwell 38. The magnetic plates 74 facilitate this tool-free attachment, which conceals the attachment 76 between the cross car beam 86 and the knee airbag cover 10. Magnetic metal material may be located in particular areas of the footwell 38 to help with locating the footwell panel during installation.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all the following: "A"; "B"; "C"; "A and B"; "A and C"; "B and C"; and "A, B, and C."

The invention claimed is:

1. A knee airbag cover, comprising:
   a covering body configured to shield an airbag module from a passenger cabin, wherein the covering body has an outer perimeter with an instrument panel facing side and a footwell facing side, wherein the covering body has an inner surface configured to face away from the passenger cabin and an outer surface configured to face toward the passenger cabin; and
   a footwell fastener that is configured to attach a footwell so as to conceal the footwell fastener and an attachment of the covering body from the passenger cabin.

2. The knee airbag cover of claim 1, wherein the footwell fastener is a magnetic plate.

3. The knee airbag cover of claim 1, further comprising a second footwell fastener, wherein the footwell fastener is located toward a door facing side of the outer perimeter and the second footwell fastener is located toward a center console facing side of the outer perimeter.

4. The knee airbag cover of claim 1, further comprising an airbag net molded into the covering body.

5. The knee airbag cover of claim 4, wherein a tear seam in the covering body at least partially surrounds the airbag net.

6. The knee airbag cover of claim 1, further comprising a plurality of airbag module fasteners molded into the covering body.

7. The knee airbag cover of claim 6, wherein the plurality of airbag module fasteners includes a plurality of metal nuts molded into a plastic covering body so as to partially surround an airbag net.

8. The knee airbag cover of claim 1, wherein a plurality of hooks is situated at the instrument panel facing side of the outer perimeter of the covering body to rotatably attach an instrument panel.

9. A vehicle, comprising:
   a cross car beam;
   an instrument panel; and
   the knee airbag cover of claim 1, wherein the knee airbag cover is located at least partially between the instrument panel and the footwell, and wherein at least one of the instrument panel, the footwell, and the knee airbag cover are connected to the cross car beam.

10. The vehicle of claim 9, wherein the footwell is directly attached to the knee airbag cover via the footwell fastener.

11. The vehicle of claim 10, wherein the attachment of the covering body is a cross car beam fastener that attaches the cross car beam to the knee airbag cover.

12. The vehicle of claim 11, wherein the cross car beam fastener is non-visible from the passenger cabin.

13. The vehicle of claim 9, further comprising an airbag module fastened to the inner surface of the covering body of the knee airbag cover.

14. A method of manufacturing the knee airbag cover of claim 1, comprising the steps of:
   molding a plastic material for the covering body around the footwell fastener; and
   wrapping the covering body with a decorative covering.

15. The method of claim 14, comprising the step of forming a tear seam in the covering body that at least partially surrounds an airbag net.

* * * * *